Nov. 21, 1950  A. J. AUDET  2,531,019
COMBINATION OIL COOLER AND AIR CONDITIONING
DEVICE FOR AUTOMOTIVE VEHICLES
Filed Jan. 12, 1949  2 Sheets-Sheet 1
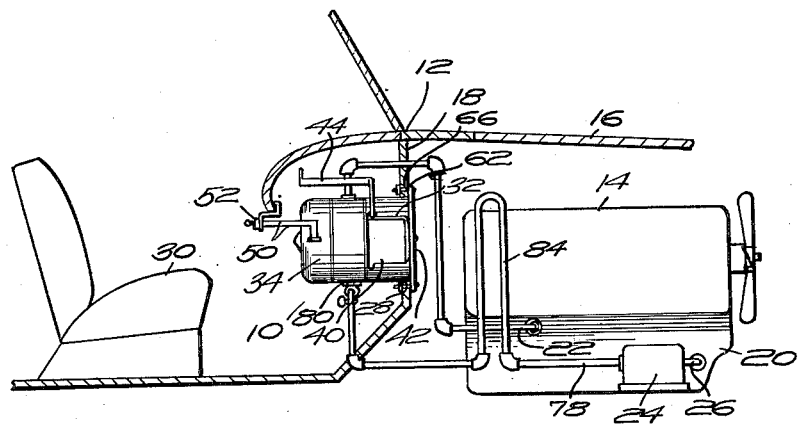
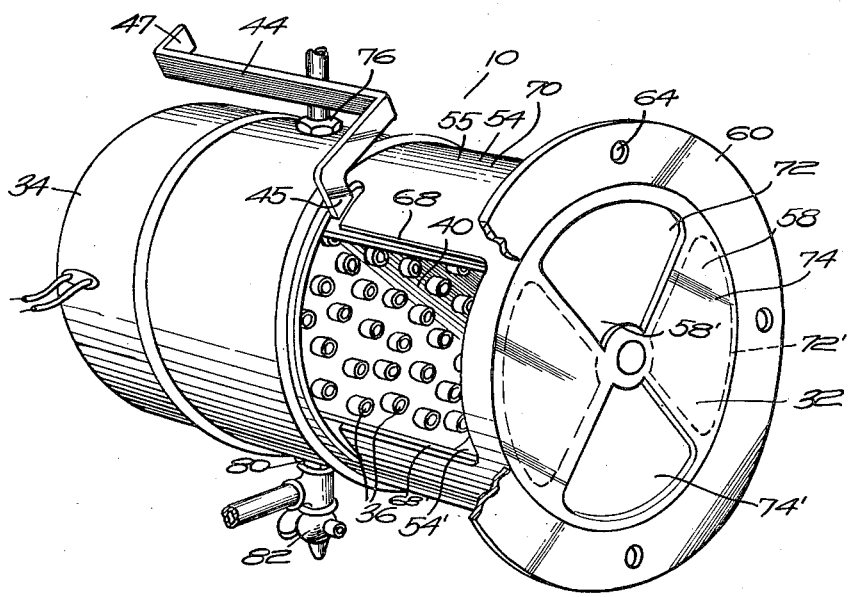
INVENTOR.
Alfred J. Audet
BY
Thomas A. Jenckes
Attorney Nov. 21, 1950  A. J. AUDET  2,531,019
COMBINATION OIL COOLER AND AIR CONDITIONING
DEVICE FOR AUTOMOTIVE VEHICLES
Filed Jan. 12, 1949  2 Sheets-Sheet 2

INVENTOR.
Alfred J. Audet
BY Thomas A. Jencks
Attorney

Patented Nov. 21, 1950

2,531,019

UNITED STATES PATENT OFFICE 2,531,019

COMBINATION OIL COOLER AND AIR CONDITIONING DEVICE FOR AUTOMOTIVE VEHICLES

Alfred J. Audet, Providence, R. I.

Application January 12, 1949, Serial No. 70,436

4 Claims. (Cl. 237—12.3)

My invention relates to improvements in combination oil coolers and air conditioning devices for automotive vehicles having a body and an engine provided with a lubricating system.

I am aware that the desirability of providing means to cool the oil in the crankcase during use has been recognized by others and that various devices have hitherto been provided for this purpose. The advantages of keeping the oil in a crankcase cool are obvious, namely, that the lower temperatures provide better lubrication and if the temperature is maintained low enough, there is no loss of oil through evaporation. The loss of oil is particularly marked in older automobiles which loss can be largely obviated by providing suitable means to cool the oil.

An object of my invention, therefore, is to provide a novel type of means to continuously cool the oil in use whether it is summertime or wintertime.

I am also aware that others have provided heaters for the body of an automotive vehicle, which heaters have been usually actuated by the water from a water cooled engine. Oil maintains a uniform heat longer than water as it is circulated.

An object of my invention is to provide a device for heating the automobile using the waste heat from the oil for this purpose, adapted for use on water or air cooled engines.

In my preferred embodiment, I provide a complete air conditioning unit for the automotive vehicle body, comprising a heat interchange unit having means permitting the passage of air in opposite directions therethrough and oil therethrough in counter current heat interchange therewith, means to force circulating air through said heat interchange means in opposite directions and selective valve means to take air from the body of the automotive vehicle and pass it through the heat interchange unit in one direction and discharge it within the body to heat the vehicle, adapted on the opposite setting thereof and on reversal of the air circulation to take air from the vehicle and exhaust it without the body, passing it through the heat interchange unit on its way to function as a cooling air conditioner for the body of the vehicle when desired.

I believe I am the first, therefore, to provide the combination of an oil cooler and a complete air conditioning unit which will function either as a heater or as a cooler for the body of the vehicle and which will at the same time maintain the oil in the lubricating system so cool as to prevent the loss thereof.

Further features of my invention relate to the particular construction of the parts of my improved device.

These and such other objects of my invention as may hereinafter appear will be best understood from a description of an embodiment thereof such as is illustrated in the accompanying drawings.

In the drawings:

Fig. 1 is a diagrammatic vertical sectional view through the body of an automobile showing the motor, driver's seat and various parts of my invention installed therein in elevation.

Fig. 2 is a perspective view of my combination heat interchange unit and valve means therefor adapted to be constructed as a single unit for attachment to the dashboard of a vehicle.

Figure 3:
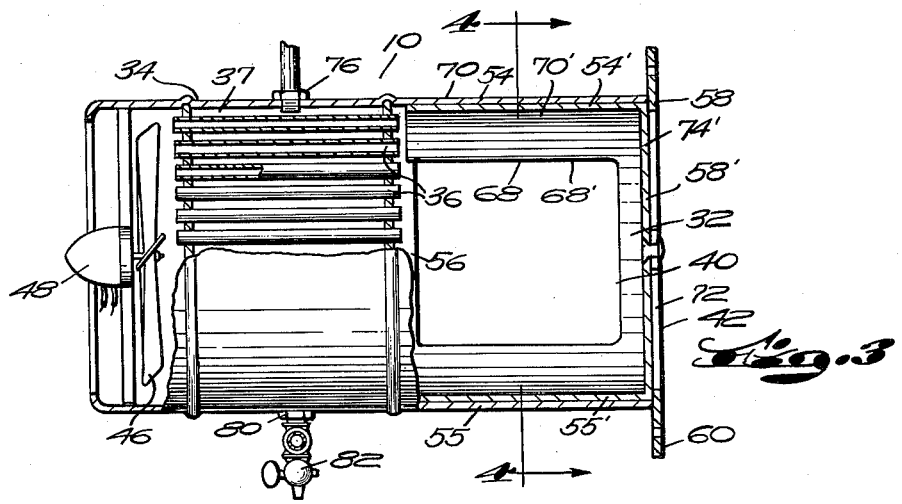
Fig. 3 is a side elevation thereof showing the valve portion and the upper portion of the heat interchange unit in section and the motor and fan in elevation with the parts in heating position.

In the drawings, wherein like characters of reference generally indicate like parts throughout, 10 generally indicates a combination oil cooler and air conditioning device constructed in accordance with my invention. Said invention is adapted for use for automotive vehicles such as the automobile shown, of the closed type, having the closed body 12 and the engine 14 located under the hood 16 and separated from the body by the dashboard 18. The crank-case 20 underlies the engine and oil is pumped as usual through the pipe 22 to the top of the crank-case from the pump 24 connected by the pipe 26 to the bottom of the crank-case. To install my invention, a suitable hole 28 is provided in the dashboard 18, usually in front of the seat 30 adjacent the driver.

My invention 10 is adapted to be mounted within the body in any suitable manner, so that the end of the valve portion 32 thereof will discharge through the hole 28 in the dashboard or other portion of the body of the vehicle.

My invention includes the heat interchange unit 34, having means 36 permitting the passage of air selectively forwardly or rearwardly therethrough, and oil therethrough in heat interchange therewith, and two-way valve means therefor, comprising valve casing means 54 connected to the outer end of the air passage means 36 of said heat interchange unit 34, having air entrance means 40 within said body and air discharge means 42 without said body, and a manually operated valve means 32, movable to positions opening the air entrance means 40 and blocking the air discharge means 42 and vice versa.

I also provide manually reversible means for circulating air in opposite directions through the air passage means, in the embodiment shown comprising the fan 46 at the opposite end of said air passage means 36 from said valve means 32, a motor 48 to rotate said fan, an electric circuit 50 to actuate said motor, and a two-way reversing switch 52 connected within said circuit.

It is thus obvious that with this construction, when the valve means 32 is moved by the handle 44 to a position opening said air entrance means 40 in said body, and said fan 46 is rotated in one direction, said device may function as an air heater for the body of the vehicle, and when said valve means 32 is moved to a position opening the air discharge means 42 and closing said air entrance means 40, and the fan 46 is rotated in the opposite direction, said device may function to suck air in the opposite direction from the body of the vehicle out said air passage means 36 and out through said air discharge means 42 to discharge air from the body of the vehicle for cooling or other purposes.

I also provide means to continuously supply heated oil from the crank-case 20 of the vehicle and pass it through the oil passage means 37 thereof in the heat interchange unit 34 with the air passing therethrough in heat interchange therewith so that the device may function at all times during operation of the fan 46 as an oil cooler.

In my preferred embodiment, my improved device 10 is constructed as follows:

My improved heat interchange unit 34 is preferably of the honeycomb type, provided with the air discharge passages or pipes 36 arranged circumferentially thereof in concentric circles or in other suitable manner permitting the passage of air axially thereof through said air passage means 36 selectively in either direction. The oil passage means 37 therefor comprises the space between the air pipes 36 for the oil to run upwardly through the heat interchange unit 34. This heat interchange unit 34 is preferably mounted within the body, so that the air passage pipes 36 extend longitudinally of the vehicle.

I provide cylindrical valve means 32, preferably of the squirrel cage type, comprising a cylindrical valve casing 54 adapted to be positioned between the front end of the heat interchange unit 34 and said dashboard 18, having a front end 42 discharging through the dashboard hole 28 and an open rear end 56 connected with the front end of said heat interchange means 34 so that the air passage means 36 thereof will be connected therewith, and a closed front wall 58. The closed front end 58 may be provided with the circumferential flange 60 to which my entire device may be attached by means of the bolts 62 passing through the bolt holes 64 in said flange and suitable holes 66 in said dashboard. Said outer casing 54 is provided with the diametric, substantially quarter cylindrical slots 68 in the side wall 55 thereof, as shown on each side thereof, providing quarter cylindrical solid portions 70 between them. The closed valve casing front wall 58 is provided with the sector shaped slots 72 diametric to each other and intermediate to and staggered relative to the slots 68 in the side wall 55, providing intermediate sector shaped solid portions 74 between them.

I provide a similarly shaped and slotted cylindrical valve 54', having the diametric quarter cylindrical slots 68' in the side wall 55' thereof, providing the intermediate quarter cylindrical portions 70' between them and the diametric slots 72' in the end wall 58', providing the diametric sector shaped solid portions 74' between them, with said sector shaped slots 72' being also intermediate to and staggered between the quarter cylindrical slots 68' in said side wall 55' of said valve. The quarter cylindrical slots 68' in the side wall 55' and the sector shaped slots 72' in the end wall 58' of said valve are similar to and of the same size as the respective side slots 68 and end slots 72 in said valve casing.

I also provide the handle means 44 projecting rearwardly from said valve, having a front end 45 secured to said valve 54' and its rear end terminating in an end 47 accessible from the driver's seat to operate the two-way valve to reverse the air connections thereof.

Figure 4:
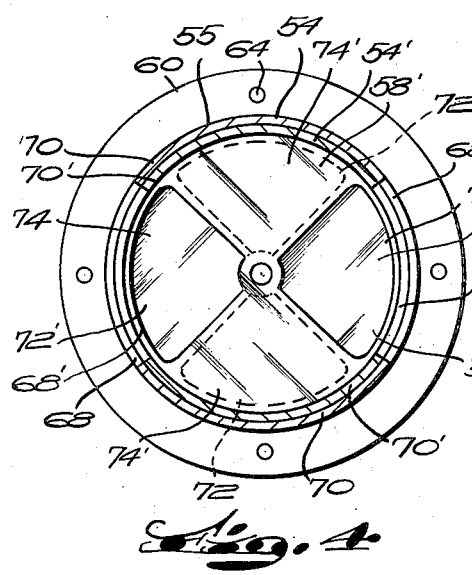
Fig. 4 is a sectional view taken transversely of my improved valve along the line 4—4 of Fig. 3 with the end slots closed and the side slots opened to permit the ingress of air from the body of the vehicle for heating purposes.
Figure 5:
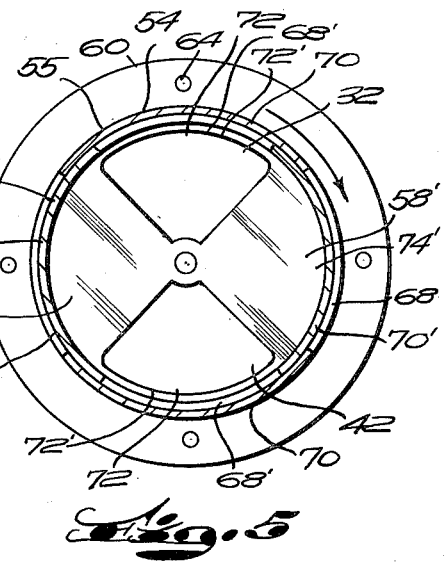
Fig. 5 is a vertical sectional view similar to Fig. 4 showing the valve means moved to permit the discharge of air through the end slots to without the body of the vehicle.

It is thus obvious that with this construction the valve 54' may be moved to a position having the slots 68' in the side wall 55' thereof in alignment with the slots 68 in the casing sidewall 55 to admit air from within said body 12 through said valve, through said air passage means 36 and said heat interchange unit 34 rearwardly, and closing the slots 72 in the front end of said valve casing by the solid portions 74' of said valve in the front wall to permit the passage of air from the body backwards through the heat interchange unit and discharge it within the body, as shown in Fig. 4, and on a quarter revolution thereof, said solid portions 70' of the side wall 55' of the valve 54' are brought into a position closing said slots 68 in the casing side wall 55 and the slots 72' in the front wall 58' of the valve 54' are brought into alignment with the slots 72 in the front wall 58 of the valve casing to discharge air forwardly from said air passage means 38 through said valve and without said body.

To provide means to circulate the air in opposite directions through the air passages 36 of the heat interchange unit, I provide the fan 46 mounted on the opposite or rear end of the air passage means 36 of said heat interchange unit 34, and I provide the reversible electric motor 48. To activate the same, I also provide the electric circuit 50 connected to a suitable source of electric supply such as the storage battery carried by the vehicle, having the reversible two-way switch 52 connected therein and mounted in a position accessible to the driver, namely, adjacent to him on the dashboard 18, for reversing the direction of rotation of said motor 48 and fan 46.

To circulate oil through the oil interchange passage 37 of the heat interchange unit, I connect the inlet pipe 22 to the top of the crankcase 20, and the upper end of said oil passage 37 as at 76 intermediate said axial air passage pipes 36, and I provide the additional pipe 78 connected to the opposite end of said pump 24 from the pipe 26, connected to the bottom of the oil passage 37, of said heat interchanger as shown at 80, preferably having the petcock or drip valve 82 therein to permit the oil to flow upwardly of said oil passage to eliminate air pockets and permit any entrapped air from being carried to the crank-case to be dissipated through the breather port, through the inlet pipe 22. To insure that the oil level in the heat interchange unit will remain near the top of said unit for heat interchange purposes, I provide the pipe 78 with the upwardly projecting U-shaped loop 84 projecting upwardly therefrom to substantially the height of the top of said heat interchange unit 34, to maintain the oil level high enough, so that all of the air passage means 36 will become subject to the heated oil and so that all of the oil in the heat interchange unit 34 may be cooled by the passage of air through the axial pipes 36 in either direction.

It is thus obvious that with the above construction when the valve 54' is moved by the handle 44 to a position aligning said side slots 68' and 68 in said valve 54' and valve casing 54 and closing said end slots 72 in said casing 54 by the solid portions 74' in said valve, and said fan 46 is rotated in one direction, namely, to pass air rearwardly through the pipes 36 from the air entrance means 40 and discharge it within the body 12 of the vehicle through the rear end of the air discharge means 36, that said device may function as an air heater for the body of the vehicle for use in the wintertime or otherwise when it is desired to heat the air in the body of the vehicle, but that if said valve is moved to a position aligning said end slots 72' of the valve 54' with the end slots 72 of the valve casing 54 opening the air discharge means 42 and with the solid portions 70' of the side wall 55' of said valve closing the slots 68 in the side wall 55 of said valve casing, closing the air entrance means, and when the switch 52 is turned to rotate the fan in the opposite direction, that air from the body of the vehicle will be forced forwardly through the open rear end of the heat interchange unit 34 through the air passage pipes 36 and outwardly through the aligned slots 72 and 72' in the front of the valve 54' and valve casing 54, discharging air outwardly from the body of the vehicle through the air discharge means 42 to function as an air cooling or air conditioning device as desired in the summertime or other times.

It is also obvious that inasmuch as air is forcibly forced through the air passage means 36 in one direction, either forwardly or backwardly at all times, that this forced passage of air will function to cool the oil passing through the oil heat interchange passage 37 of the heat interchange unit 34 to make the device function at all times during the operation of the fan as an oil cooler. In place of the fan 46 and motor 48, any other suitable type of reversing means for circulating air through the air passage means 36 may be provided.

The respective air passage means 36 and oil passage means 37 in the heat interchange unit 34 may be of any suitable construction and shape. The U bend 84 insures that the oil level will be maintained at all times at the height of the oil passage means 37 in said heat interchange unit.

As the heated air is discharged towards the engine and underneath the hood in the summertime, it is obvious that it may be readily dissipated with the heated air from the engine without affecting the heat in the body of the vehicle, thus providing a real air conditioning or cooling device for the automotive vehicle in the summertime.

It is apparent that I have provided a novel type of combination oil cooler and air conditioning device for automotive vehicles which will function at all times as a continuous oil cooler and selectively as an air cooler in summertime and as a heater for the air in the body of the car in the wintertime, with the advantages explained above.

It is understood that my invention is not limited to the specific embodiment shown and that various deviations may be made therefrom without departing from the spirit and scope of the appended claims.

What I claim is:

1. A combination oil cooler and air conditioning device for automotive vehicles comprising a tubular casing open at both ends, one end opening outside the vehicle body and the other end opening towards the inside, said casing having a side body opening into the inside of the vehicle body, a heat exchange unit in said casing, means for passing the hot lubricating oil of the vehicle engine transversely through said heat exchange unit, means for selectively blowing air in either direction axially of said casing through said heat exchange unit, and a two-way valve means on said casing controlling the outside end opening and the inside side opening whereby said valve will close one opening and open the other opening in one position and open the first opening and close the second opening in a second position.

2. A combination oil cooler and air conditioning device for automotive vehicles comprising a tubular casing open at both ends, one end opening outside the vehicle body and the other end opening towards the inside, said casing having a side body opening into the inside of the vehicle body, a heat exchange unit in said casing, means for passing the hot lubricating oil of the vehicle engine transversely through said heat exchange unit, means for selectively blowing air in either direction axially of said casing through said heat exchange unit, said means comprising a reversible motor driven fan mounted in said casing adjacent the inner open end thereof and a two-way valve means on said casing controlling the outside end opening and the inside side opening whereby said valve will close one opening and open the other opening in one position and open the first opening and close the second opening in a second position.

3. A combination oil cooler and air conditioning device for automotive vehicles comprising a tubular casing open at both ends, one end opening outside the vehicle body and the other end opening towards the inside, said casing having a side body opening into the inside of the vehicle body, a heat exchange unit in said casing, means for passing the hot lubricating oil of the vehicle engine transversely through said heat exchange unit, means for selectively blowing air in either direction axially of said casing through said heat exchange unit, and a two-way valve means on said casing controlling the outside end opening and the inside side opening whereby said valve will close one opening and open the other opening in one position and open the first opening and close the second opening in a second position, said valve means comprising a cylindrical portion adapted to slide over the side opening of said casing and a slotted portion adapted to close end slots in the outside end opening of said casing.

4. A combination oil cooler and air conditioning device for automotive vehicles comprising a tubular casing open at both ends, one end opening outside the vehicle body and the other end opening towards the inside, said casing having a side body opening into the inside of the vehicle body, a heat exchange unit in said casing, means for passing the hot lubricating oil of the vehicle engine transversely through said heat exchange unit, means for selectively blowing air in either direction axially of said casing through said heat exchange unit, said means comprising a reversible motor driven fan mounted in said casing adjacent the inner open end thereof and a two-way valve means on said casing controlling the outside end opening and the inside side opening whereby said valve will close one opening and open the other opening in one position and open the first opening and close the second opening in a second position, said valve means comprising a cylindrical portion adapted to slide over the side opening of said casing and a slotted portion adapted to close end slots in the outside end opening of said casing.

ALFRED J. AUDET.

REFERENCES CITED

The following references are of record in the file of this patent:

UNITED STATES PATENTS

| Number | Name | Date |
|---|---|---|
| 1,853,333 | Bates | Apr. 12, 1932 |
| 1,895,503 | Will | Jan. 31, 1933 |

FOREIGN PATENTS

| Number | Country | Date |
|---|---|---|
| 44,235 | Denmark | June 15, 1931 |